(12) United States Patent
Inenaga et al.

(10) Patent No.: US 7,266,567 B2
(45) Date of Patent: Sep. 4, 2007

(54) ABSOLUTE ENCODER AND ABSOLUTE VALUE SIGNAL GENERATION METHOD

(75) Inventors: Masamichi Inenaga, Fukuoka (JP); Koji Suzuki, Fukuoka (JP); Yuji Arinaga, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 281 days.

(21) Appl. No.: 10/499,707

(22) PCT Filed: Oct. 24, 2002

(86) PCT No.: PCT/JP02/11073
§ 371 (c)(1),
(2), (4) Date: Jun. 21, 2004

(87) PCT Pub. No.: WO03/054485

PCT Pub. Date: Jul. 3, 2003

(65) Prior Publication Data
US 2005/0122242 A1  Jun. 9, 2005

(30) Foreign Application Priority Data
Dec. 21, 2001  (JP) ............................. 2001-389000

(51) Int. Cl.
*G06F 7/00* (2006.01)
(52) U.S. Cl. .................. 707/104.1; 707/101
(58) Field of Classification Search .......... 707/1–104.1
See application file for complete search history.

(56) References Cited

U.S. PATENT DOCUMENTS 4,839,834 A * 6/1989 Omae et al. ............... 702/147
4,901,073 A * 2/1990 Kibrick ...................... 341/13
5,519,546 A * 5/1996 Lewis ....................... 360/48
5,724,264 A * 3/1998 Rosenberg et al. ......... 702/152
5,936,378 A * 8/1999 Iijima et al. ............... 318/807
6,125,337 A * 9/2000 Rosenberg et al. ......... 702/153
6,384,752 B1 * 5/2002 Suzuki et al. ............... 341/111
6,564,168 B1 * 5/2003 Hasser ....................... 702/163

FOREIGN PATENT DOCUMENTS

| JP | 63-1777278 | * | 1/1987 |
| JP | 63-177278 A | | 7/1988 |
| JP | 05-133764 A | | 5/1993 |
| WO | WO 00/05553 A1 | | 2/2000 |

* cited by examiner

*Primary Examiner*—Don Wong
*Assistant Examiner*—Linh Black
(74) *Attorney, Agent, or Firm*—Sughrue Mion, PLLC

(57) ABSTRACT

An absolute encoder comprising a first memory operable to store a first absolute value signal produced every constant time period, the absolute value signal representing an absolute value position. A second memory stores a second absolute value signal produced in a previous time period. A comparing/calculating section compares the first absolute value and the second absolute value and produce a difference amount. A dividing process section divides the difference amount in an equal rate within a producing time period of said first absolute value signal. An interpolated absolute value signal producing section reads the second absolute value signal and adds the difference amount in a stepwise manner.

4 Claims, 5 Drawing Sheets

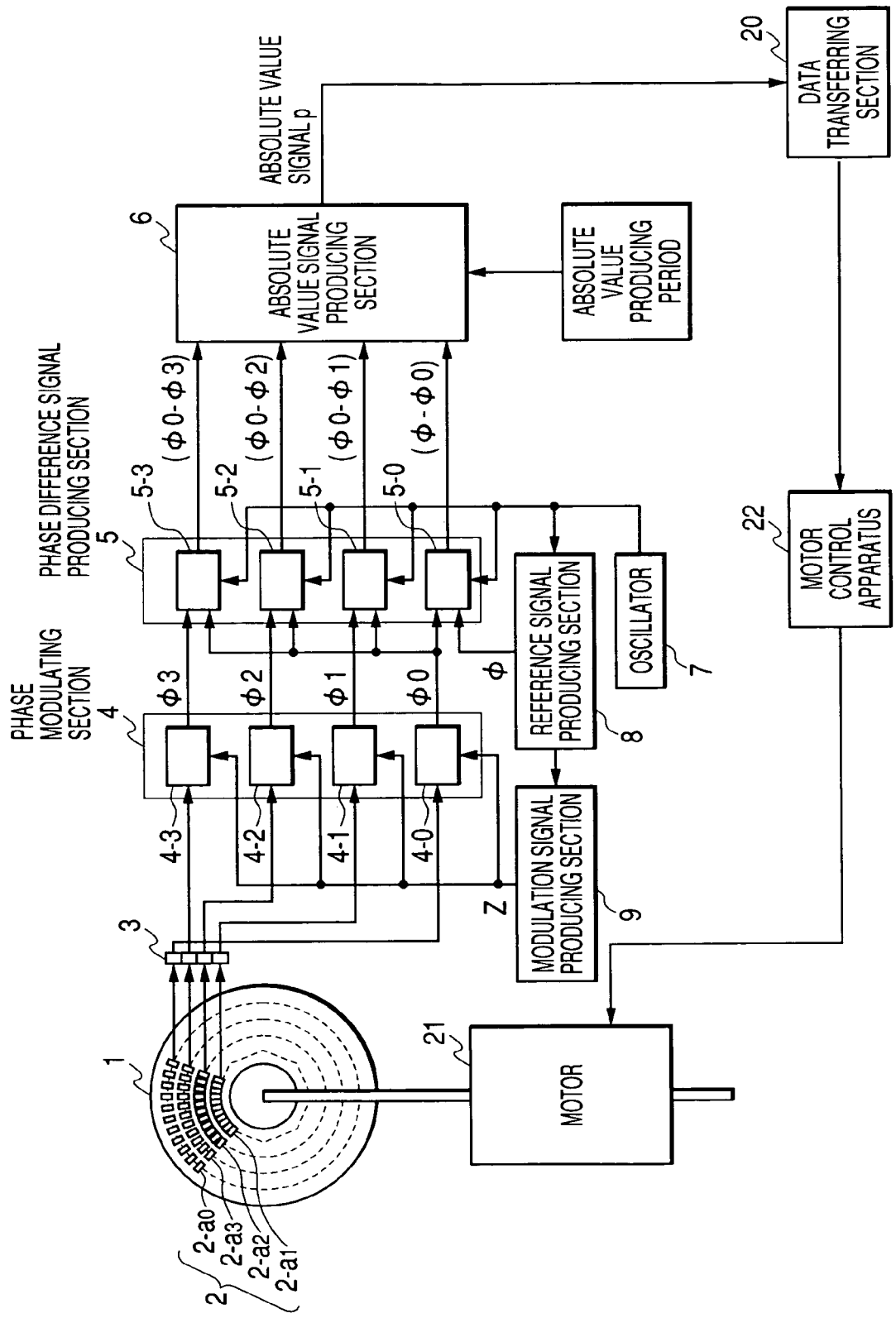

US 7,266,567 B2

ABSOLUTE ENCODER AND ABSOLUTE VALUE SIGNAL GENERATION METHOD

TECHNICAL FIELD

The present invention is related to a vernier type absolute encoder and an absolute value signal producing process method thereof, which are capable of producing a continuous interpolated absolute value signal from an absolute value signal which is intermittently produced in a constant time period, while the interpolated absolute value signal does not depend upon an absolute value producing time period, a control time period of a motor control apparatus, and a transfer method. Also, a correct motor feedback rotation angle can be obtained, and furthermore, even when erroneous operation occurs due to noise and the like, errors cannot be stored in the vernier absolute encoder and the absolute value signal producing process method.

BACKGROUND ART

Conventionally, an absolute encoder capable of producing an absolute value signal in a constant time period is constructed as shown in FIG. 4. It should be understood that both the conventional technique and the present invention will be explained by exemplifying vernier type absolute encoders.

FIG. 4 is a block diagram for schematically indicating a signal processing section of the conventional vernier type absolute encoder. In FIG. 4, reference numeral 1 shows a rotary disk; reference numeral 2 indicates a slit stream; reference numeral 3 represents a magnetic sensor; reference numeral 4 denotes a phase modulating section; reference numeral 5 shows a phase difference signal producing section; reference numeral 6 indicates an absolute value signal producing section; reference numeral 7 represents an oscillator; reference numeral 8 denotes a reference signal producing section; reference numeral 9 indicates a modulation signal producing section; reference numeral 20 shows a data transfer section; reference numeral 21 is a motor; and also, reference numeral 22 represents a motor control apparatus.

While positional information of the same equal pitch is formed on the rotary disk 1, 4 sets of the slit streams 2 are provided, the pitch numbers of which are different from each other. The magnetic sensor 3 is constituted by an MR element and a bias magnet, and outputs two phases of sine waves having pitches equal to the slit pitches. The sine wave signals outputted from the magnetic sensor 3 are inputted to the phase modulating section 4 so as to be converted into phase signals $\phi1$, $\phi2$, $\phi3$. The respective phase signals $\phi1$, $\phi2$, $\phi3$ are entered to the phase difference signal producing section 5. The phase difference signal producing section 5 detects phase differences between $\phi1$, $\phi2$, $\phi3$ and $\phi0$ so as to produce phase difference signals ($\phi0-\phi1$), ($\phi0-\phi2$), ($\phi0-\phi3$). These phase difference signals ($\phi0-\phi1$), ($\phi0-\phi2$), ($\phi0-\phi3$) are entered to the absolute value signal producing section 6, so that the absolute signal producing section 6 intermittently, produces an absolute value signal "p" in the time period of the phase signal $\phi0$. Also, since this produced absolute value signal "p" is used so as to control the motor 21 on which the rotary disk 1 is mounted, this absolute value signal "p" is transferred in either a parallel mode or a serial mode by the data transferring section 20 to the motor control apparatus 22 (for instance, republished Japanese Patent No. WO/05553).

However, the conventional technique owns the below-mentioned problems.

FIG. 5 is a diagram for showing a relationship as to motor feedback rotation angles, namely, FIG. 5(a) indicates such a motor feedback rotation angle relationship in the case that a motor control time period and an absolute value producing time period are defined in a synchronous manner, and FIG. 5(b) shows such a motor feedback rotation angle relationship in the case that a motor control time period and an absolute value producing time period are defined in an asynchronous manner.

(1). In the case that the motor 21 which should be controlled is rotated at a constant speed by using the intermittently produced absolute value signal "p", if the motor control time period of the motor control apparatus 22 is synchronized with the absolute value producing time period, then such a motor feedback rotation angle having no speed variation can be obtained as represented in FIG. 5(a). In order to synchronize the motor control time period with the absolute value producing time period, timing on the side of the motor control apparatus 22 must be matched with timing on the side of the encoder. Also, in such a case that the absolute value producing time period is changed due to changes in technical specifications of the rotary disk 1 and the slit stream 2, technical specifications of the motor control apparatus 22 are also required to be changed.

(2). Also, when the motor control time period is not synchronized with the absolute value producing time period, as represented in FIG. 5(b), the motor feedback rotation angle acquired by the motor control apparatus 22 becomes such a signal having a speed variation, and thus, the encoder can hardly acquire the continuous interpolated absolute value signal.

(3). Also, there is another producing method. That is, an absolute value is read when an initial setting operation is carried out, and thereafter, an incremental signal is produced so as to increment an initial absolute signal. However, in such a case that an erroneous operation occurs due to noise, or the like, there is a problem that errors are stored and an absolute position is shifted.

The present invention has been made to solve the above-described problem, and therefore, has an object to provide both an absolute encoder and an absolute value signal producing process method of the absolute encoder, which are capable of producing a continuous interpolated absolute value signal from an absolute value signal which is intermittently produced in a constant time period, while the interpolated absolute value signal does not depend upon an absolute value producing time period, a control time period of a motor control apparatus, and a transfer method.

DISCLOSURE OF THE INVENTION

To solve the above-described problem, the present invention recited in Claim 1 is related to an absolute encoder. That is, in such an absolute encoder comprising: a plurality of slit streams having different pitch numbers from each other, in which positional information of the same pitch is formed; a plurality of sensors which are relatively moved with respect to the slit streams so as to detect the positional information; a phase modulating section for converting a signal derived from the sensor into a phase signal; a phase difference signal producing section for converting both the phase modulation signal and a phase difference signal between two pieces of arbitrary phase signals into a digital signal; and an absolute value signal producing section for producing a signal which is related to an absolute value position in a constant time period based upon the digital signal converted by the phase difference signal producing section and the phase difference signal, the absolute encoder is arranged by: a first memory for storing thereinto an absolute value signal which is produced by the absolute value signal producing section every constant time period; a second memory for storing thereinto an absolute value signal which has been produced in one-preceding time period with respect to a time period of an absolute value signal entered into the first memory; a comparing/calculating section for comparing the absolute value signal stored in the first memory with the absolute value signal which has been produced in the one-preceding time period and has been stored in the second memory so as to calculate an increase/decrease amount; a dividing process section for dividing the increase/decrease amount in an equal rate within a producing time period of the absolute value signal; and an interpolated absolute value signal producing section for reading the absolute value signal which has been produced in the one-preceding time period, and thereafter, for adding/subtracting the divided increase/decrease amount in a stepwise manner with respect to the read absolute value signal.

Also, the present invention recited in Claim 2 is related to an absolute value signal producing process method of an absolute encoder. That is, in such an absolute encoder in which: positional information as to a plurality of slit streams having different pitch numbers from each other is detected by a plurality of sensors; a signal derived from the sensor is converted into a phase signal by a phase modulating section; both the phase modulation signal and a phase difference signal between two pieces of arbitrary phase signals are converted into a digital signal by a phase difference signal producing section; and a signal related to an absolute value signal is produced in a constant time period based upon the digital signal converted by the phase difference signal producing section and the phase difference signal by an absolute value signal producing section, an absolute value signal producing process method of the absolute encoder is featured by that an absolute value signal which is produced by the absolute value signal producing section every constant time period is stored into a first memory; an absolute value signal which has been produced in one-preceding time period with respect to a time period of an absolute value signal entered into the first memory is stored into a second memory; the absolute value signal stored in the first memory is compared with the absolute value signal which has been produced in the one-preceding time period and has been stored in the first memory by a comparing/calculating section so as to calculate an increase/decrease amount; the increase/decrease amount is divided by a dividing process section in an equal rate within a producing time period of the absolute value signal; and after reading the absolute value signal which has been produced in the one-preceding time period, the divided increase/decrease amount is added/subtracted in a stepwise manner with respect to the read absolute value signal by an interpolated absolute value signal producing section.

BRIEF DESCRIPTION OF THE DRAWINGS

FIG. 4 is the block diagram of the signal processing section of the conventional vernier type absolute encoder.

FIG. 5 is the relationship diagram of the motor feedback rotation angle, i.e.

BEST MODE FOR CARRYING OUT THE INVENTION

Referring now to drawings, an embodiment of the present invention will be described.

Figure 1:
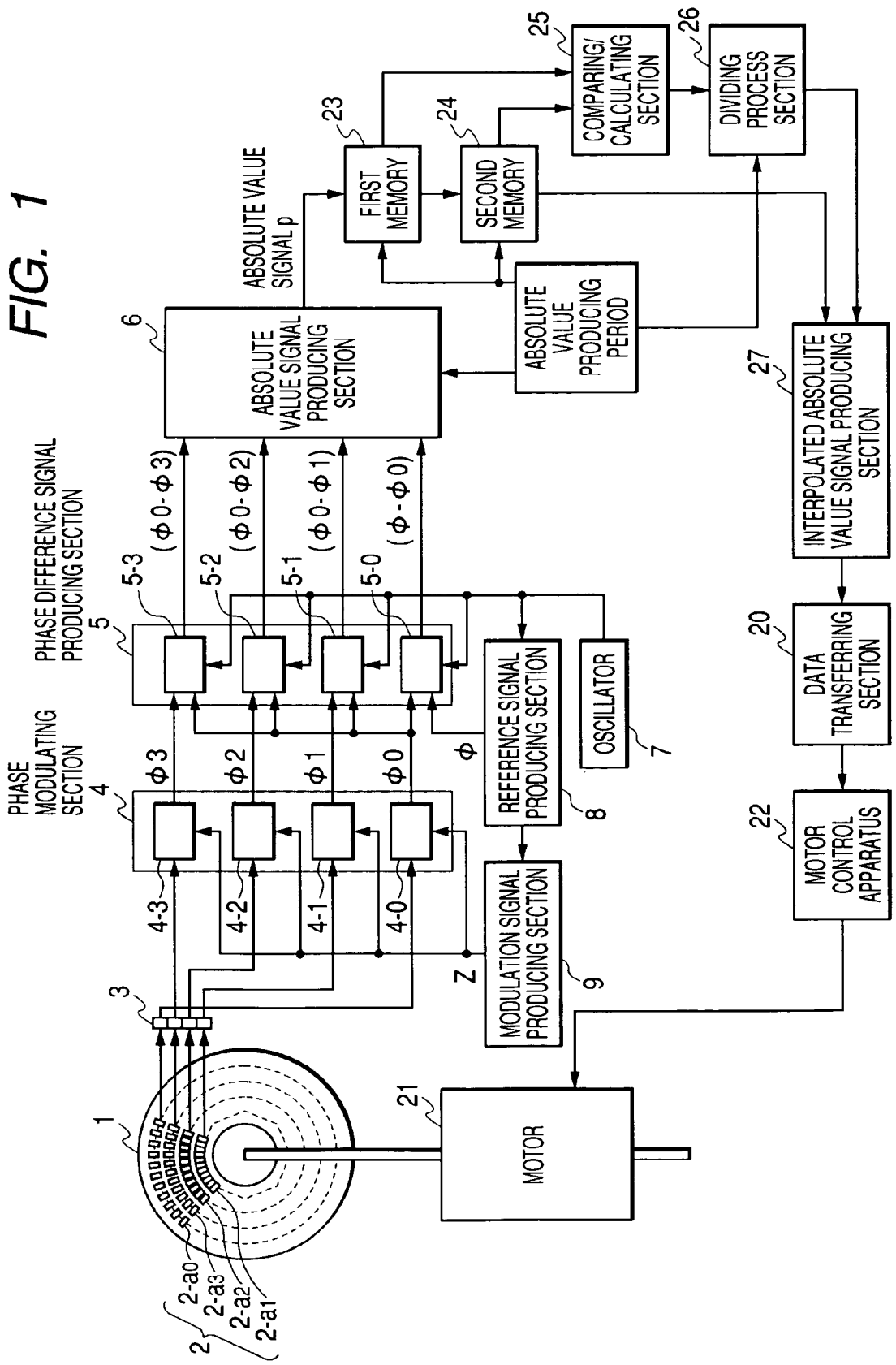
FIG. 1 is a block diagram of a signal processing section of a vernier type absolute encoder for indicating an embodiment of the present invention.
Figure 2:
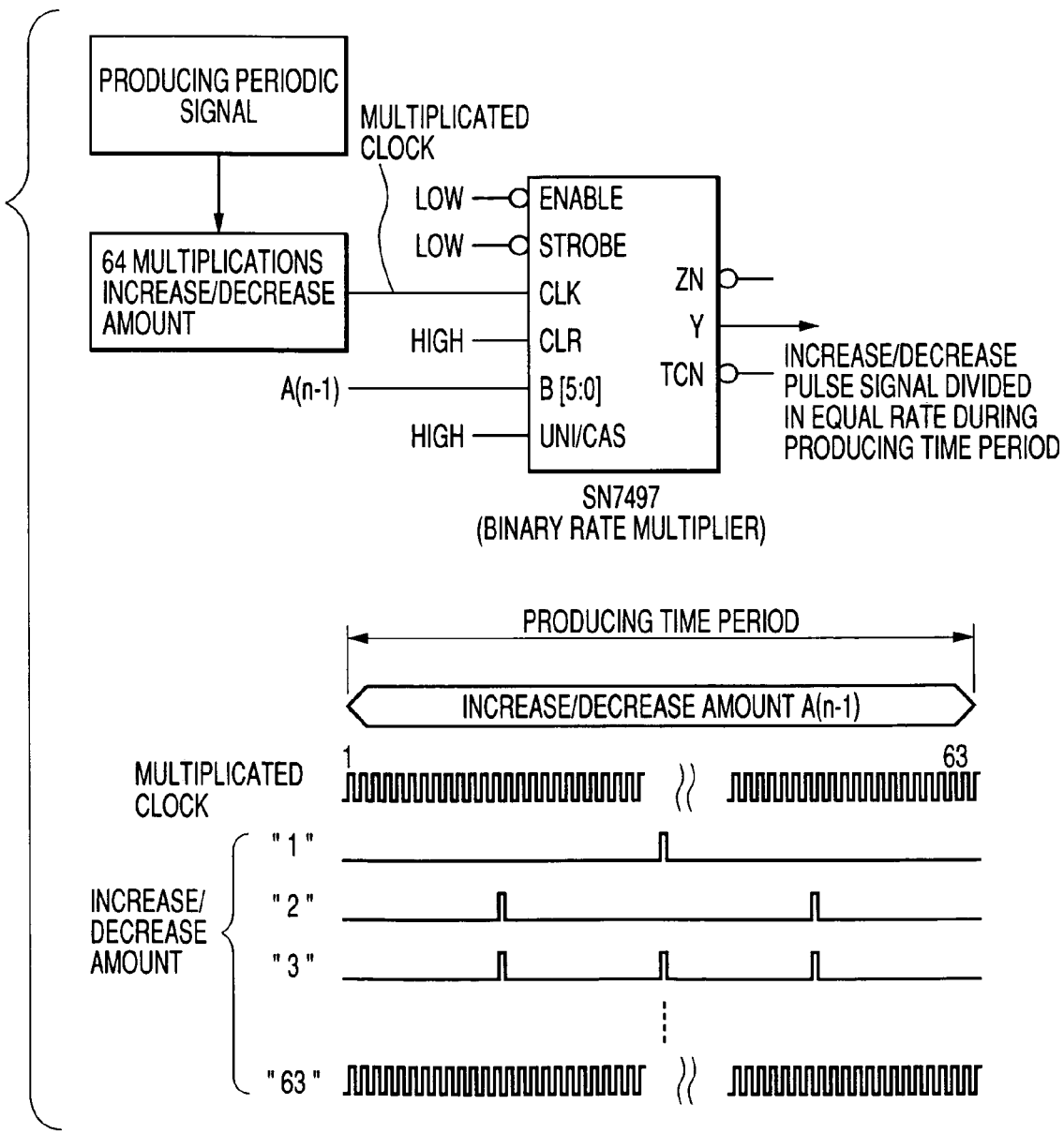
FIG. 2 is a structural diagram of a dividing process section for showing the embodiment of the present invention.
Figure 3:
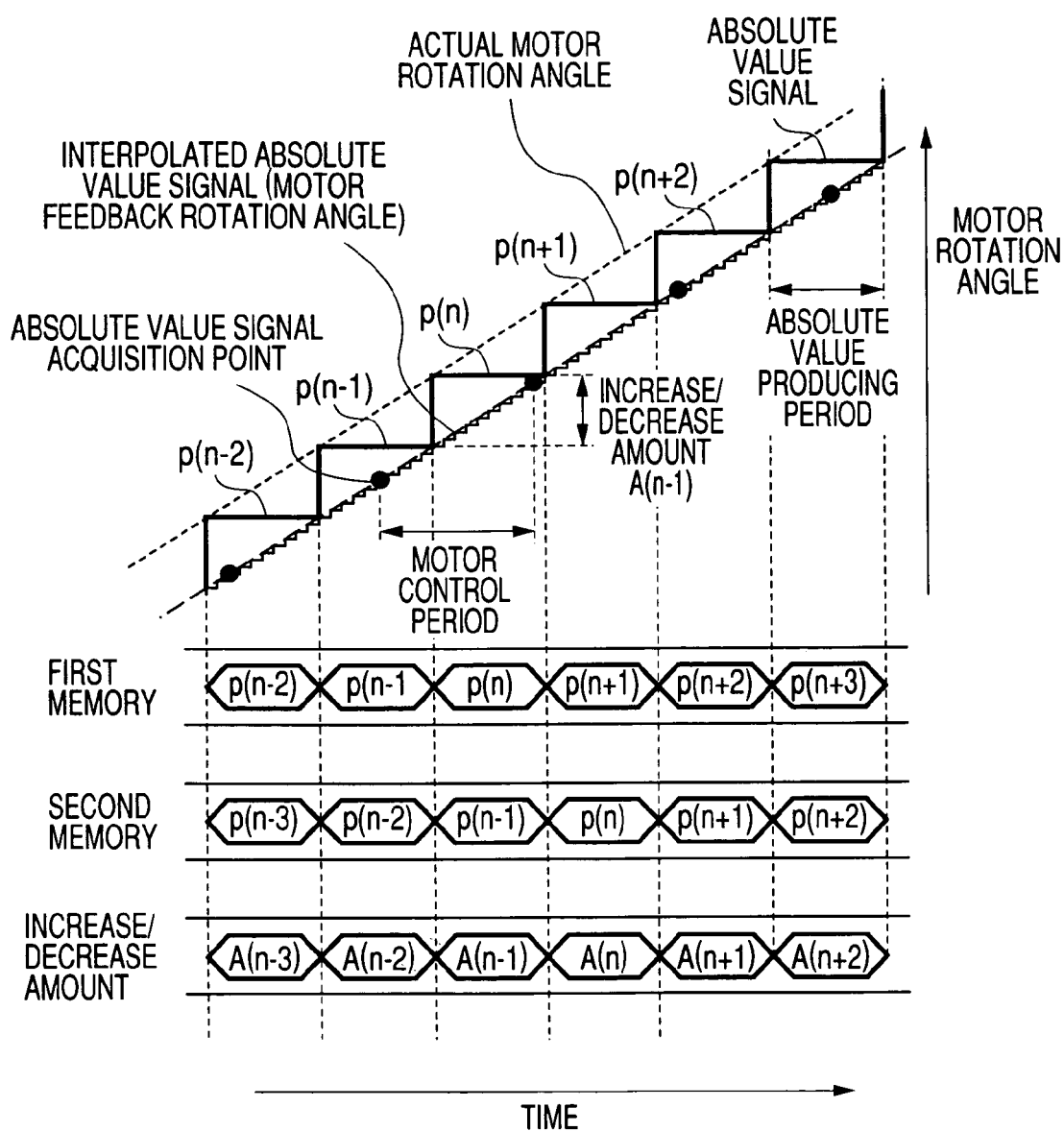
FIG. 3 is a relationship diagram of a motor feedback rotation angle for indicating the embodiment of the present invention.
Figure 5A:
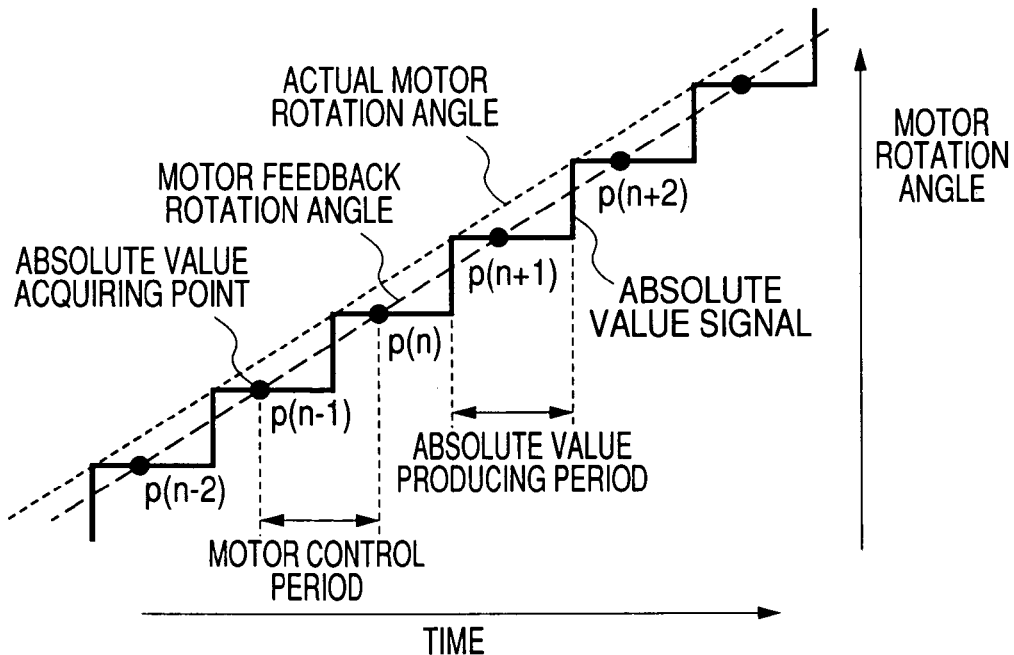
FIG. 5(a) shows the motor feedback rotation angle relationship in the case that the motor control time period is synchronized with the absolute value producing time period.
Figure 5B:
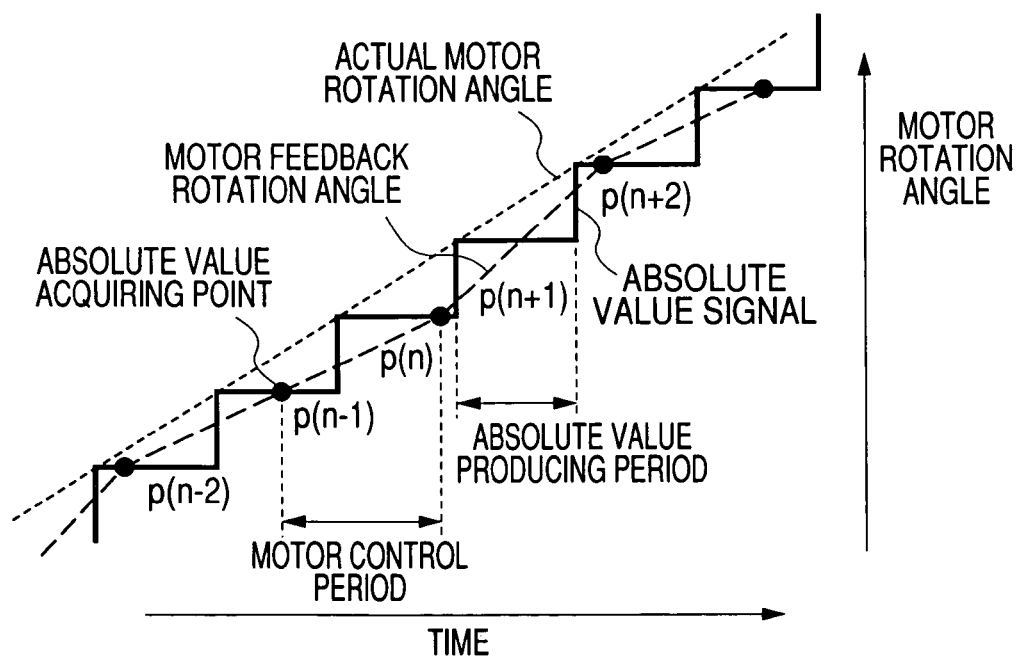
FIG. 5(b) shows the motor feedback rotation angle relationship in the case that the motor control time period is not synchronized with the absolute value producing time period.

FIG. 1 is a block diagram for schematically indicating a signal processing section of a vernier type absolute encoder which represents an embodiment of the present invention. FIG. 2 is a structural example of a dividing process section which indicates the embodiment of the present invention. FIG. 3 is a relationship diagram of a motor feedback rotation angle which shows the embodiment of the present invention. It should be understood that when structural elements of the present invention are the same as those of the conventional technique, explanations thereof are omitted, and only different points will be explained.

In FIG. 1, reference numeral 23 shows a first memory; reference numeral 24 indicates a second memory; reference numeral 25 represents a comparing/calculating section; reference numeral 26 denotes a dividing process section; and reference numeral 27 shows an interpolated absolute value signal producing section.

In other words, the vernier type absolute encoder, according to the present invention, is featured to be arranged by the first memory 23, the second memory 24, the comparing/calculating section 25, the dividing process section 26, and the interpolated absolute value signal producing section 27. The first memory 23 stores thereinto an absolute value signal which is produced by the absolute value signal producing section 6 every time a constant time period has passed. The second memory 24 stores thereinto such an absolute value signal which has been produced in a time period before the time period of the absolute value signal inputted in the first memory 23 by one time period. The comparing/calculating section 25 compares the absolute value signal stored in the first memory 23 with the absolute value signal stored in the second memory 24, which has been produced in one-preceding time period with respect to that of the first-mentioned absolute value signal, and then, calculates an increase/decrease amount. The dividing process section 26 divides the increase/decrease amount in an equal rate during the producing time periods of the absolute value signals. The interpolated absolute value signal producing section 27 reads the absolute value signal produced in one-preceding time period, and thereafter, adds/subtracts the divided increase/decrease amounts in a stepwise manner.

Next, operations of the absolute encoder will now be described.

A sensor signal outputted from the magnetic sensor 3 is entered to the phase modulating section 4 so as to be converted into phase signals "φ1" to "φ3." In this case, a phase signal corresponds to a binary signal having a constant time period under such a stationary state that a modulation signal "z" is modulated by a sensor output, and an edge position of this phase signal with respect to a reference signal "φ" constitutes phase information. The respective phase signals "φ1" to "φ3" are inputted to the phase difference signal processing section 5. The phase signal "φ0" derived from a slit "2-a0" becomes such a phase difference signal (φ-φ1) by detecting a phase difference between the reference signal φ and the own phase signal φ0 in a phase difference signal producing section 5-0. The phase signals "φ1", "φ2", "φ3" derived from slits "2-a1", "2-a2", "2-a3" become such a phase difference signal (φ0-φ1), another phase difference signal (φ0-φ2), and another phase difference signal (φ0-φ3), respectively, by detecting phase differences with respect to the reference signal "φ0" by the phase difference signal producing section 5.

Signals outputted from the phase difference signal producing section 5 correspond to such signals which have been converted into digital amounts based upon a clock number of the oscillator 7 which is entered between edges of two phase signals inputted to this phase difference signal producing section 5. These signals are entered to the absolute signal producing section 6 so as to produce an absolute value signal "p."

The absolute value signal "p" is produced by the absolute value signal producing section 6 every time a constant producing time period has passed. When an absolute value signal "p(n)" is produced, this absolute value signal "p(n)" is stored in the first memory 23, and at the same time, another absolute value signal "p(n-1)" which has been produced in one-preceding time period with respect to the time period of the above-described absolute value signal p(n)" is stored in the second memory 24.

The comparing/calculating section 25 compares the absolute value signal p(n) which has been stored in the first memory 23 with the absolute value signal p(n-1) which has been stored in the second memory 24 so as to calculate an increase/decrease amount A(n-1).

The increase/decrease amount A(n-1) is entered to the dividing process section 26, and then, this dividing process section 26 outputs such a signal that the increase/decrease amount A(n-1) has been divided in an equal rate within a producing time period.

A concrete structural example as to the above-explained dividing process section 26 is indicated in FIG. 2. As shown in this concrete structural example, while a bit number which is required for a maximum increase/decrease amount is previously calculated which may be obtained from both an absolute value producing time period and a maximum rotation number of a motor, a binary rate multiplier circuit is employed which corresponds to this calculated bit number. The increase/decrease amount is set as a binary rate every absolute value producing time period, and a multicated clock is used as a clock input, so that increase/decrease pulses which have been divided in the equal rate within the producing time period are outputted from the dividing process section 26. The multiplicated clock is obtained by multiplicating the absolute value producing time period and is required for the maximum increase/decrease amount.

The interpolated absolute signal producing section 27 reads the absolute value signal p(n-1) which has been produced in one-preceding time period and has been stored in the second memory 24, and then, adds/subtracts such increase/decrease pulses with respect to the absolute value signal p(n-1) so as to produce an interpolated absolute signal, while using the above-described increase/decrease pulses which have been divided in the equal rate within such a producing time period corresponding to the increase/decrease amount A(n-1) outputted from the dividing process section 26.

The interpolated absolute value signal produced from the interpolated absolute value signal producing section 27 is fed back via the data transferring section 20 to the motor control apparatus 22, and thus, this motor control apparatus 22 controls the motor 21 based upon this data. As a consequence, the absolute value signal "p" which is intermittently produced every producing time period can be interpolated to produce such a continuous absolute value signal as shown in FIG. 3.

As a consequence, the absolute encoder of the present invention is arranged by such an absolute encoder comprising: a plurality of slit streams 2 having different pitch numbers from each other, in which positional information of the same pitch is formed; a plurality of sensors 3 which are relatively moved with respect to the slit streams 2 so as to detect the positional information; a phase modulating section 4 for converting a signal derived from the sensor 3 into a phase signal; a phase difference signal producing section 5 for converting both the phase modulation signal and a phase difference signal between two pieces of arbitrary phase signals into a digital signal; and an absolute value signal producing section 6 for producing a signal which is related to an absolute value position in a constant time period based upon the digital signal converted by said phase difference signal producing section 5 and the phase difference signal; in which the absolute encoder is arranged by: a first memory 23 for storing thereinto an absolute value signal which is produced by the absolute value signal producing section 6 every constant time period; a second memory 24 for storing thereinto an absolute value signal which has been produced in one-preceding time period with respect to a time period of an absolute value signal entered into the first memory 23; a comparing/calculating section 25 for comparing the absolute value signal stored in the first memory 23 with the absolute value signal which has been produced in the one-preceding time period and has been stored in the second memory 24 so as to calculate an increase/decrease amount; a dividing process section 26 for dividing the increase/decrease amount in an equal rate within a producing time period of the absolute value signal; and an interpolated absolute value signal producing section 27 for reading the absolute value signal which has been produced in the one-preceding time period, and thereafter, for adding/subtracting the divided increase/decrease amount in a stepwise manner with respect to the read absolute value signal. Accordingly, the continuous interpolated absolute value signal can be produced from the absolute value signals which are intermittently produced in the constant time period, while the continuous interpolated absolute value does not depend upon the absolute value producing time period, the control time period of the motor control apparatus 22, and the transfer method.

Also, while the motor control period of the motor control apparatus 22 need not be synchronized with the absolute value producing time period, the correct motor feedback rotation angle is obtained. Even in such a case that the absolute value producing time period is changed since the technical specifications as to the rotary disk 1 and the slit stream 2 are changed, the technical specification with respect to the motor control apparatus 2 need not be changed, and only changing of the encoder processing section can accept the above-explained specification changes in the rotary disk 1 and the slit stream 2.

Furthermore, as compared with such a method that the absolute value is read during the initial setting operation, and thereafter, the incremental signal is produced, and the initial absolute value signal is incremented in order to read/interpolate the absolute value signal "p" every producing time period, which is intermittently produced every producing time period, there is such an effect that the vernier type absolute encoder can be realized in which even when the erroneous operation happens to occur due to noise, the errors are not stored.

It should also be noted that this embodiment has described such an example that the absolute encoder is applied to the rotary type motor. However, the present invention is not limited only to this embodiment, but may be applied to a linear motor.

Also, with respect to the sensor for detecting the positional information of the slit stream, the magnetic type sensor has been explained in the above-described example. The magnetic sensor may be alternatively replaced by an optical type sensor, or another sensor constituted by combining a magnetic type sensor with an optical type sensor.

INDUSTRIAL APPLICABILITY

As previously described, both the absolute encoder and the absolute value signal producing process method thereof, according to the present invention, are usefully employed in, for instance, a vernier type absolute encoder which produces an absolute value signal in a constant time period.

The invention claimed is:

1. An absolute encoder comprising:
a plurality of slit streams having different pitch numbers from each other, in which positional information of the same pitch is formed;
a plurality of sensors which are relatively moved with respect to said slit streams so as to detect said positional information;
a phase modulating section for converting a signal derived from said sensor into a phase signal;
a phase difference signal producing section for converting both said phase modulation signal and a phase difference signal between two pieces of arbitrary phase signals into a digital signal; and
an absolute value signal producing section for producing a signal which is related to an absolute value position in a constant time period based upon the digital signal converted by said phase difference signal producing section and the phase difference signal; wherein:
the absolute encoder is arranged by:
a first memory for storing thereinto an absolute value signal which is produced by said absolute value signal producing section every constant time period;
a second memory for storing thereinto an absolute value signal which has been produced in one-preceding time period with respect to a time period of an absolute value signal entered into said first memory;
a comparing/calculating section for comparing the absolute value signal stored in said first memory with the absolute value signal which has been produced in said one-preceding time period and has been stored in said second memory so as to calculate an increase/decrease amount;
a dividing process section for dividing said increase/decrease amount in an equal rate within a producing time period of said absolute value signal; and
an interpolated absolute value signal producing section for reading the absolute value signal which has been produced in said one-preceding time period, and thereafter, for adding/subtracting said divided increase/decrease amount in a stepwise manner with respect to the read absolute value signal wherein the absolute encoder is operable to provide the result of adding/subtracting as a position information.

2. In an absolute encoder in which:
positional information as to a plurality of slit streams having different pitch numbers from each other is detected by a plurality of sensors;
a signal derived from said sensor is converted into a phase signal by a phase modulating section;
both said phase modulation signal and a phase difference signal between two pieces of arbitrary phase signals are converted into a digital signal by a phase difference signal producing section; and
a signal related to an absolute value signal is produced in a constant time period based upon the digital signal converted by said phase difference signal producing section and the phase difference signal by an absolute value signal producing section,
an absolute value signal producing process method of the absolute encoder wherein:
an absolute value signal which is produced by said absolute value signal producing section every constant time period is stored into a first memory;
an absolute value signal which has been produced in one-preceding time period with respect to a time period of an absolute value signal entered into said first memory is stored into a second memory;
the absolute value signal stored in said first memory is compared with the absolute value signal which has been produced in said one-preceding time period and has been stored in said second memory by a comparing/calculating section so as to calculate an increase/decrease amount;
said increase/decrease amount is divided by a dividing process section in an equal rate within a producing time period of said absolute value signal; and
after reading the absolute value signal which has been produced in said one-preceding time period, said divided increase/decrease amount is added/subtracted in a stepwise maimer with respect to the read absolute value signal by an interpolated absolute value signal producing section and providing a result of the addition/subtraction as a position information.

3. An absolute encoder comprising:
a first memory operable to store a first absolute value signal produced every constant time period, the absolute value signal representing an absolute value position;
a second memory operable to store a second absolute value signal produced in a previous time period;
a comparing/calculating section operable to compare the first absolute value and the second absolute value and produce a difference amount;
a dividing process section operable to divide the difference amount in an equal rate within a producing time period of said first absolute value signal;
an interpolated absolute value signal producing section operable to add the difference amount in a stepwise manner to the second absolute value signal wherein the absolute encoder is operable to provide the result of adding/subtracting as a position information.

4. A position producing method comprising:

storing a first absolute value signal in a first memory at every constant time period;

storing a second absolute value signal produced in one-preceding time period with respect to the first absolute value signal into a second memory;

calculating a difference amount between the first absolute value signal and the second absolute value signal;

dividing the difference amount in an equal rate within a producing time period; and adding the difference amount in a step-wise manner to the second absolute value signal and providing a result of the addition as a position information.

* * * * *